(12) United States Patent
Carlon

(10) Patent No.: US 7,540,608 B2
(45) Date of Patent: Jun. 2, 2009

(54) EYEWEAR WITH IMPROVED SIDEPIECE CONNECTION

(76) Inventor: Roberto Carlon, Castello, 2971, Venice (IT) I-30121

( * ) Notice: Subject to any disclaimer, the term of this patent is extended or adjusted under 35 U.S.C. 154(b) by 227 days.

(21) Appl. No.: 11/602,188

(22) Filed: Nov. 21, 2006

(65) Prior Publication Data

US 2007/0126980 A1    Jun. 7, 2007

(30) Foreign Application Priority Data

Nov. 25, 2005    (IT)    .............................. BO05A0712

(51) Int. Cl.
*G02C 5/22*    (2006.01)
(52) U.S. Cl. ..................... 351/153; 351/121; 16/228
(58) Field of Classification Search ................. 351/110, 351/111, 113–119, 121, 153; 16/228
See application file for complete search history.

(56) References Cited

U.S. PATENT DOCUMENTS

| 5,732,444 | A | * | 3/1998 | Horikawa et al. | ............. | 16/228 |
| 5,894,336 | A | * | 4/1999 | Baldissarutti | ............... | 351/153 |
| 2005/0094091 | A1 | * | 5/2005 | Hsu | ........................... | 351/110 |

* cited by examiner

*Primary Examiner*—Huy K Mai
(74) *Attorney, Agent, or Firm*—Young & Thompson

(57) ABSTRACT

Eyewear (10) includes lens elements (12, 14), sidepiece Members (16, 18) for supporting the eyewear and means (20, 22) for connecting the lens elements or the related mounts to the sidepiece members. The connecting elements include a pin portion (24) extending from each lens element and which is inserted into a hole (26) in the respective sidepiece to form elements for rotating the sidepiece with respect to the lens elements.

49 Claims, 4 Drawing Sheets

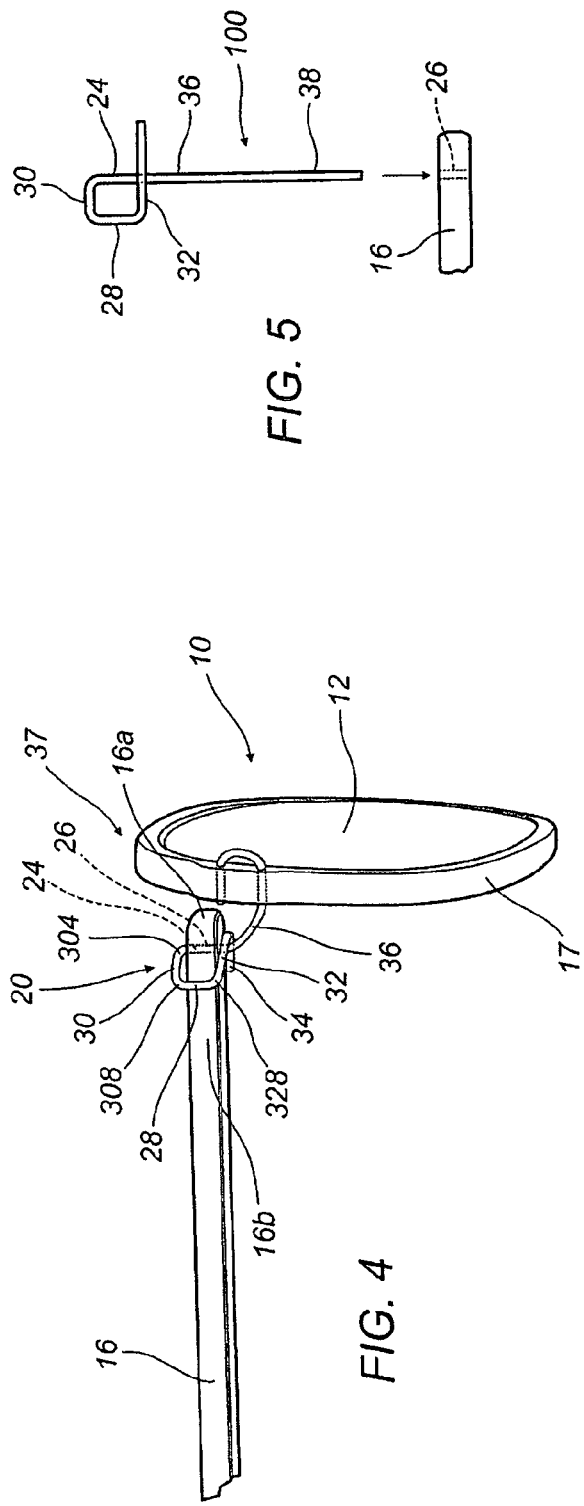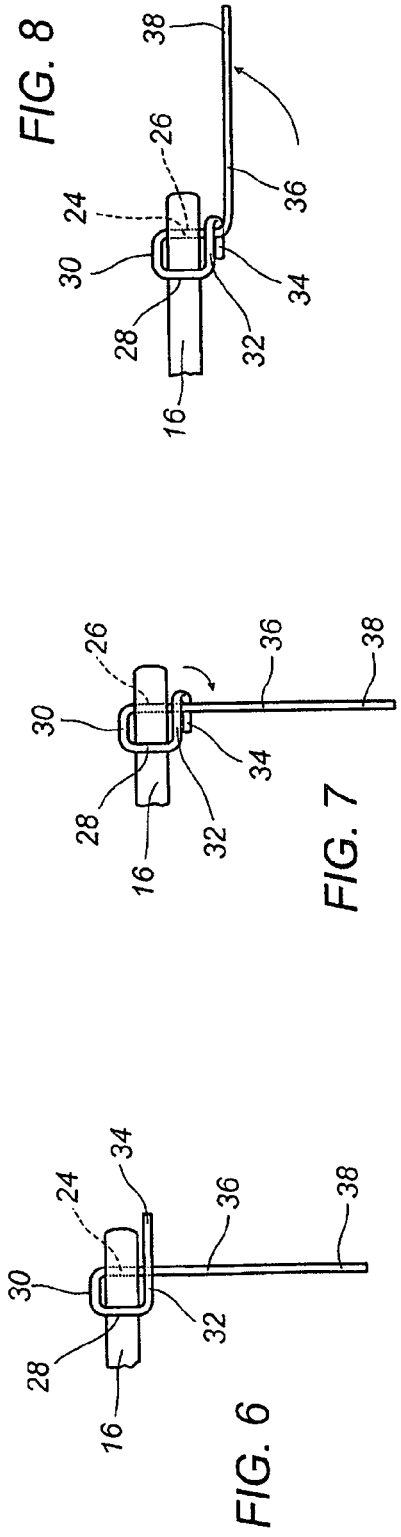

EYEWEAR WITH IMPROVED SIDEPIECE CONNECTION

FIELD OF THE INVENTION

This invention relates to eyewear.

BACKGROUND OF THE INVENTION

U.S. Pat. No. 6,860,597 discloses eyewear in which the sidepieces, made of metal wire, end with C-shaped portions which are inserted into the lenses.

In the eyewear field, however, a general need is felt for eyewear where the connection between the sidepieces and the lenses, or the lens mount, is at once elegant and unobtrusive, easy to make and practical to use.

The field also feels the need for eyewear in which the connection between the sidepieces and the lenses, or the lens mount, does not, unlike traditional eyewear, require the use of fastening screws, which are easily loosened and lost, glue, which wears off and allows detachment of parts, and welds, which create weak points that break very easily.

In particular, the field feels the need for eyewear with sidepieces and/or lens mounts made of a rigid, though fragile, substance such as horn or the like but without the disadvantages that such a substance brings to traditional eyewear of this kind which tends to crack and break quite easily.

SUMMARY OF THE INVENTION

It is therefore provided eyewear comprising lens means, sidepiece means for supporting the eyewear and means for connecting the lens means to the sidepiece means, wherein the connecting means comprise a pin portion connected to each lens means and which is inserted into a hole in the respective sidepiece to form means for rotating the sidepiece with respect to the lens means.

This provides a particularly unobtrusive point of attachment between the sidepiece and the lens, providing a connection that is simple yet elegant and such as not to create excessive stress on the connected parts.

According to another advantageous aspect, it is provided eyewear comprising lens means, sidepiece means for supporting the eyewear and means for connecting the lens means to the sidepiece means, and further comprising means for stopping the rotation of the sidepiece.

In particular, the rotation stopping means comprise a portion, specifically a pin portion, that is laterally spaced outwards relative to the rotation pin.

The rotation stopping means also comprise a portion, specifically a pin portion, that is longitudinally spaced towards the back of the eyewear, relative to the rotation pin.

According to yet another aspect, the rotation stopping means comprise a pin means that extends from the rotation pin.

BRIEF DESCRIPTION OF THE DRAWINGS

These and other technical characteristics of the eyewear according to the invention are clearly described in the claims below and the advantages of the invention are apparent from the detailed description which follows, with reference to the accompanying drawings which illustrate a preferred embodiment of it provided merely by way of example without restricting the scope of the inventive concept, and in which:

FIG. 4 is a perspective side view showing a detail of the means for connecting the sidepiece to the respective mount;

FIGS. 5 to 8 illustrate the steps for assembling the preferred embodiment of the eyewear.

DESCRIPTION OF THE PREFERRED EMBODIMENTS OF THE INVENTION

Figure 1:
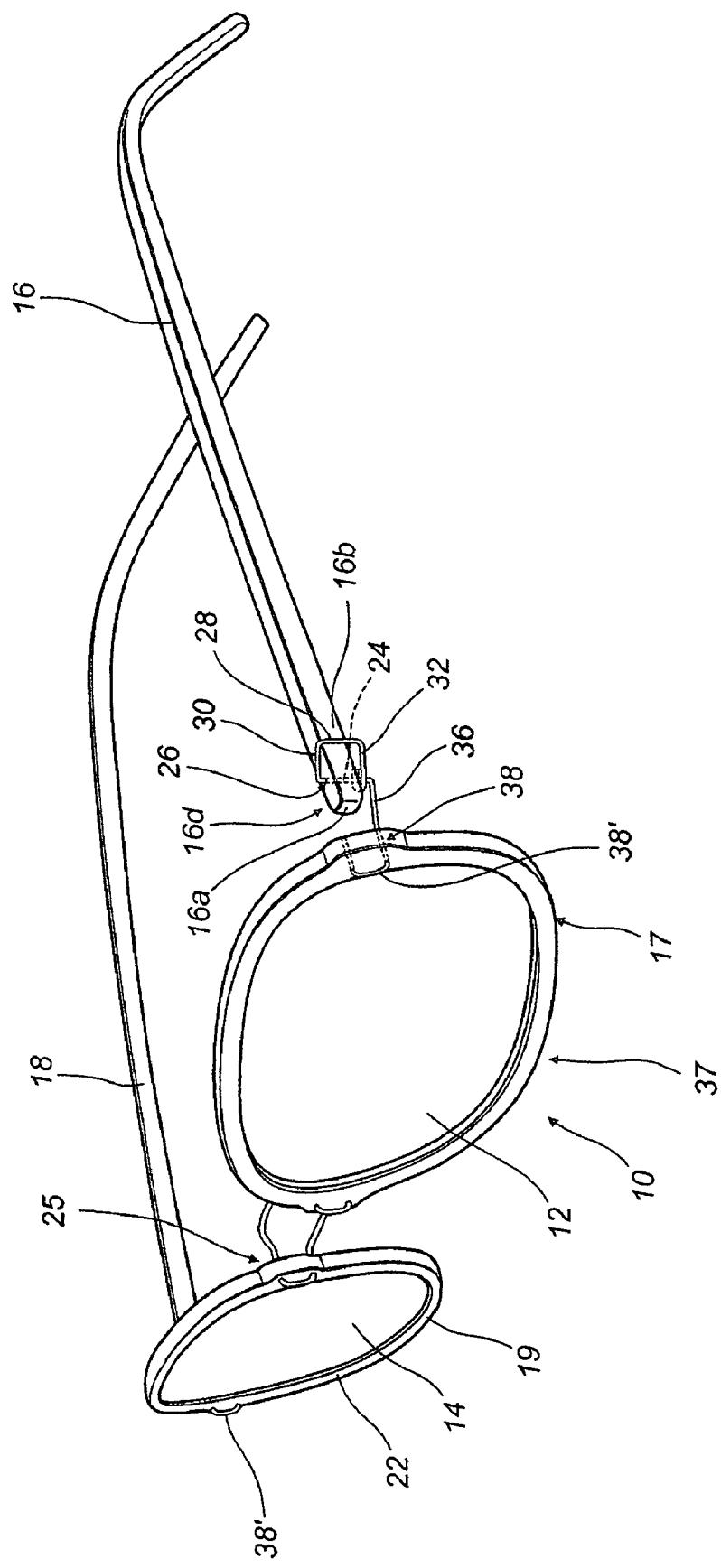
FIG. 1 is a perspective view of a preferred embodiment of the eyewear according to the invention.

FIGS. 1 to 4 illustrate a preferred embodiment 10 of the eyewear according to this invention.

The eyewear comprises lens means, consisting of a first and a second lens 12 and 14, and sidepiece means, consisting of a first and a second sidepiece 16 and 18, for supporting the eyewear on the wearer's face.

Preferably, the first and second lenses 12, 14 are connected by a respective bridge 25, made from metal wire and thus very light, which is inserted directly into the mount but which, in another version, might be inserted directly into the body of each lens, on the latter's inner side, that is to say, on the side opposite that from which the respective sidepiece extends. Extending from the bridge 25 there are nose pads, labeled 25a, 25b.

In another embodiment, the bridge, instead of being a separate part, might be an integral part of the mount, preferably made of horn, in which the lenses 12, 14 are set.

Means 20, 22 are also provided for connecting the lens means to the sidepiece means 16, 18.

In this description, the term "lens means" is used to denote either the lenses and similar means, as such, or the lenses in combination with their mounts, as in the embodiment illustrated.

Thus, it will be understood that, instead of being connected to the lens mounts as illustrated here, the sidepieces might, if the invention is applied to rimless eyewear, be connected directly to the lenses themselves.

In practice, these means for connecting the sidepiece means to the lens means are attached directly to each lens mounting rim; otherwise, the means for connecting the sidepiece means to the lens means can be attached directly to the lenses.

Advantageously, the means for connecting the sidepieces to the lens means are made of metal wire and comprise a respective pin portion 24 extending from the lens means 12, 14 and which is inserted into a hole 26 in the respective sidepiece, thus providing means for rotating the sidepiece with respect to the lens means.

As illustrated, the hole 26 into which the rotation pin 24 is inserted is made at one end of the respective sidepiece 16 at a predetermined distance from the front transversal edge 16a of the sidepiece 16.

Further, the hole 26 is made at a predetermined distance from the respective outer lateral face 16b of the sidepiece 16.

More specifically, the distance of the hole 26 from the front transversal edge 16a of the sidepiece is substantially the same as the distance between the hole 26 and the outer lateral face 16b of the sidepiece.

As illustrated, the hole 26 in the sidepiece and the pin 24 extending from the lens means are substantially vertical or substantially perpendicular to the plane in which the sidepieces lie.

Figure 2:
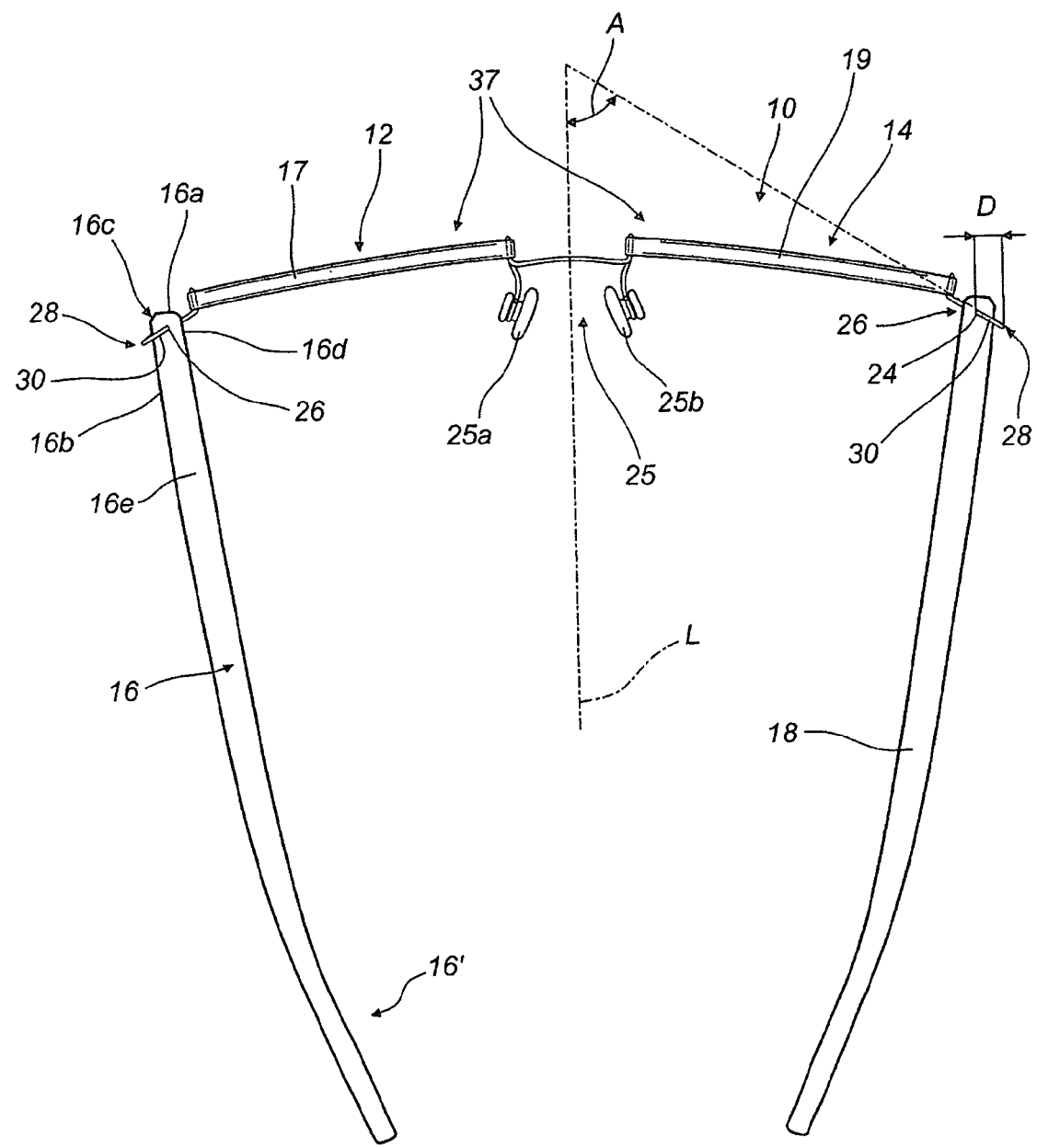
FIG. 2 is a top plan view of the preferred embodiment of the eyewear according to the invention.
Figure 3:
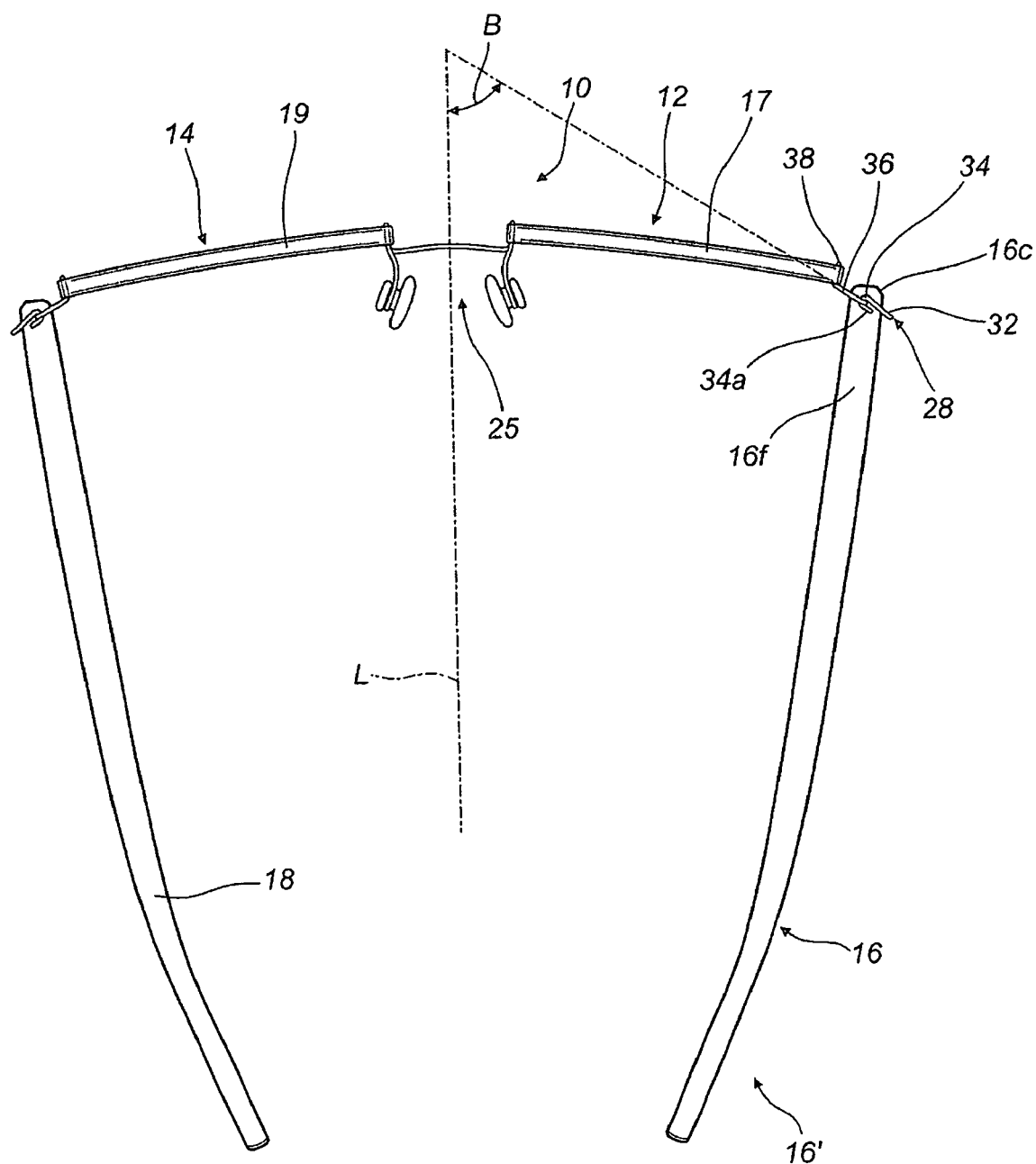
FIG. 3 is a bottom plan view of the preferred embodiment of the eyewear according to the invention.

Advantageously, as illustrated, between the front transversal edge 16a of the sidepiece and the corresponding outer lateral face 16b of the sidepiece, there is a rounded corner portion 16c designed to allow the sidepiece to turn freely towards a folded, rest position, where the sidepiece is substantially parallel to the lenses, or, starting from this position, towards a sidepiece open position, illustrated in FIGS. 1 to 3, in which the eyewear can be worn by the user, avoiding interference with the perpendicular pin, as described in more detail below.

Further, as illustrated, the hole 26 is substantially equidistant from the outer lateral face 16b and the inner lateral face 16d of the sidepiece 16.

Means are provided for stopping the rotational opening movement of the sidepiece 16—starting from a rest position, where the sidepiece is substantially parallel to the lenses—at an open position where the sidepiece is substantially longitudinal, that is, perpendicular to the lenses 12, 14 on the wearer's face.

Advantageously, the rotation stop means comprise a portion, specifically a pin portion 28, that extends vertically and comes into contact with the outer face 16b of the sidepiece.

Advantageously, the stopping portion 28 is laterally spaced towards the outside of the eyewear relative to the rotation pin 24.

Advantageously, the pin portion 28 is also longitudinally spaced towards the back of the eyewear relative to the rotation pin 24.

As illustrated, the rotation stop means 28 is advantageously supported by the rotation pin 24 through a connecting portion 30 extending at an angle towards the back of the eyewear.

More specifically, as illustrated, the portion 30 for connecting the stopping portion 28 to the rotation pin portion 24 extends at an angle to an imaginary line 'L' running longitudinally through the center of the eyewear.

The respective sidepiece comprises, as illustrated with reference to the sidepiece 16, a top face 16e, a bottom face 16f and ends with a slightly curved portion 16' that rests on the wearer's ear.

As illustrated, the connecting portion 30 extends above the sidepiece 16, and specifically, above the top face 16e of the sidepiece, in a substantially horizontal direction, or with a middle part of it that is substantially horizontal with reference to the position of the eyewear when they are being worn.

A second portion 32 is provided for connecting the portion 28 that stops the rotational opening movement of the sidepiece to the rotation pin portion 24.

The second portion 32 for connecting the stopping portion 28 to the rotation pin portion 24 also extends at an angle towards the back of the eyewear, that is to say, at an angle to the longitudinal center line 'L'.

As illustrated, the second connecting portion 32 extends under the sidepiece, and specifically, under the bottom face 16f of the sidepiece, in a substantially horizontal direction, or with a part of it that is substantially horizontal.

In particular, the second connecting portion 32 extends from the rotation stop portion 28 and ends with a hooked portion 34 that engages the rotation pin portion 24, specifically the portion or part of the rotation pin 24 that extends under the bottom face 16f of the sidepiece 16.

Looking in more detail at the drawings, the hooked portion 34 has an end portion 34a that runs in substantially the same direction as the connecting portion 32 from which it extends.

As shown in more detail in FIG. 4, the first and second portions 30 and 32 connecting the stopping portion 28 to the rotation pin 24 are joined by curved sections 304, 308, 328 to the respective pin portions 24 and 28.

More specifically, the first, upper portion 30 connecting the stopping portion 28 to the rotation pin portion 24 is joined to the latter by curved sections 304, 308; while the second connecting portion 32 is joined by a respective curved section 328 to the stopping portion 28 from which it extends.

In other terms, we might say that a semi-annular portion 28, 30, 32, extends from the pin portion 24, in particular on its outer side, in such a way as to engage the corresponding portion of the sidepiece.

As illustrated, the length of the respective connecting portion 30, 32 is greater than the distance between the rotation hole 26 and a corresponding adjacent edge of the sidepiece, more specifically, the rounded corner 16c. This facilitates the rotation of the sidepiece.

Advantageously, the transversal distance "D" between the sidepiece rotation stop means and the rotation pin 24 is adjustable or variable. For this purpose, it is sufficient to bend or change the angle "A" of the connecting wire portion 30 and, if necessary, of the other connecting and hooking portion 32.

In fact, even the respective connecting portion 30, 32 can simply be bent—for example by an optician or by the eyeglass user—in order to adjust or vary as desired the angle it makes with the rotation pin 24 and the rotation stop means 28.

As shown in the drawings, there is also a portion 36 extending from the lens means 12 and from which the rotation pin 24 extends vertically.

As illustrated, the extension portion 36 extends at an angle towards the back of the eyewear to make an angle "B" with the longitudinal center line 'L'.

In particular, the portion 30 connecting the rotation stop portion 28 to the rotation pin portion 24 is inclined, and more specifically, inclined towards the back of the eyewear, at an angle "A" which, as in the case of the second connecting portion 32, is preferably different from the angle "B" made by the extension portion 36.

As illustrated, the portion 36 extending from the lens means is substantially horizontal and is inclined, and more specifically, inclined towards the back of the eyewear, at an angle "B" which is, advantageously, adjustable or variable.

The invention also contemplates the provision of a C-shaped portion 38 for attaching the hinge of the lens means 12, in particular, directly to the lens mount.

The C-shaped attachment portion 38 is connected to respective holes provided in the body of the mount 37 and has a substantially vertical section 38' on the front side of the eyewear.

Extending from the C-shaped portion, behind the lens means, is the extension portion 36 from which the vertical pin, or portion, 24 for rotating the sidepiece extends.

Advantageously, these means for connecting the lens means to the sidepiece means are made from metal wire and, more specifically, consist of a single, suitably bent piece of metal wire, as described in more detail in the rest of this specification.

The metal used to make the wire that forms the connecting means is preferably titanium, while the sidepiece means and the lens mounts, if present, are preferably made of horn.

FIGS. 5 to 8 illustrate a preferred embodiment of a method for making the means for connecting the sidepiece to the lens of eyewear according to the invention.

In practice, the method according to the invention comprises the steps of inserting a metal wire 100 into a hole 26 in a respective sidepiece 16 and bending the metal wire in such a way as to form means for rotating the sidepiece and means for attaching the sidepiece, as well as means for stopping the rotational opening movement of the sidepiece.

The method thus involves bending a metal wire beforehand in such a way as to form a main longitudinal portion 24, 36, 38 from which a transversal portion 30 extends, with a second longitudinal portion 28, shorter than the first longitudinal portion 24, 36, 38 in turn extending from this transversal portion 30.

As illustrated, the method also involves bending the metal wire beforehand in such a way as to form a second transversal portion 32, 34 extending from the second longitudinal portion 28.

According to the method, as shown in FIGS. 5 and 6, the main longitudinal portion 24, 36, 38 is then inserted into a hole 26 in a respective sidepiece 16 in such manner that the portion 24, closest to the transversal portion 30, remains inside the hole 26 in the sidepiece and in such manner that the second transversal portion 32, 34 goes through the body of the sidepiece 16 to the side opposite the one where the first transversal portion 30 is positioned.

FIG. 7 shows how the free end 34 of the second transversal portion is then bent around the first longitudinal portion 34 to form a hooked attachment portion.

As shown in FIG. 8, the remaining part of the first longitudinal portion 24, 36, 38 is then bent so it lies in substantially the same plane as the sidepiece and forms the extension portion for attachment to the lens means.

The lens mount, like the sidepieces, may be made of horn, Plexiglas or other plastic or natural substance. Further, the sidepieces might be cylindrical or slightly tapered in shape, that is to say, their cross section might be circular.

The invention thus provides an articulated joint connecting the sidepieces and the lenses in such a way as to reduce the risk of breaking the structural parts (sidepieces and lens mounts) of the eyewear, especially when they are made of horn, a relatively brittle substance.

Indeed, a joint made according to the invention is very flexible and light and, since it does not transmit stress to the components it is connected to, minimizes the risk of breaking.

In addition, the provision of a bridge 25 made of metal wire between a first and a second rim 17 and 19 mounting respective lenses 12 and 14, made preferably of horn, further reduces the stress peaks which the structural parts of the eyewear according to the invention are subjected to, with obvious advantages in terms of durability.

Moreover, the invention also thus provides eyewear that does not, unlike traditional eyewear, require the use of fastening screws, which are easily loosened and lost, glue, which wears off and allows detachment of parts, and welds, which create weak points that will very easily break.

The invention described has evident industrial applications and may be subject to modifications and variations without thereby departing from the scope of the inventive concept. Moreover, all the details of the invention may be substituted by technically equivalent means.

What is claimed is:

1. An eyewear (10), comprising:
   lens means (12, 14);
   sidepiece means (16, 18) for supporting the eyewear; and
   means (20, 22) for connecting the lens means to the sidepiece means made of horn,
   wherein the means for connecting the lens means (12, 14) to the sidepiece means (16, 18) are made of a metal wire defining a pin portion (24) connected to the lens means (12) and which is inserted into a hole (26) in the respective sidepiece (20) to form means for rotating the sidepiece (20) with respect to the lens means (12).

2. The eyewear according to claim 1, wherein the hole (26) made in the respective sidepiece and the rotation pin (24) extending from the lens means are substantially vertical.

3. The eyewear according to claim 1, wherein the hole (26) is made at a predetermined distance from the front transversal edge (16a) of the sidepiece (16).

4. The eyewear according to claim 1, wherein the hole (26) is made at a predetermined distance from the outer lateral face (16b) of the sidepiece (16).

5. The eyewear according to claim 4, wherein the distance of the hole (26) from the front transversal edge (16a) is substantially the same as the distance between the hole (26) and the outer lateral face (16b) of the sidepiece (16).

6. The eyewear according to claim 4, wherein the front transversal edge (16a) and the outer lateral face (16b) of the sidepiece (16) are joined by a rounded corner portion (16c).

7. The eyewear according to claim 4, wherein the hole (26) is substantially equidistant from the outer lateral face (16b) and the inner lateral face (16d) of the sidepiece (16).

8. The eyewear according to claim 1, comprising means (28) for stopping the rotation of the sidepiece (16).

9. The eyewear according to claim 8, wherein the rotation stop means comprise a portion (28) that is laterally spaced outwards relative to the rotation pin (24).

10. The eyewear according to claim 8, wherein the rotation stop means comprise a portion (28) that is longitudinally spaced towards the back of the eyewear relative to the rotation pin (24).

11. The eyewear according to claim 8, wherein the rotation stop means are in the form of a pin portion (28).

12. The eyewear according to claim 8, wherein the rotation stop means comprise a vertically extending portion (28).

13. The eyewear according to claim 8, wherein the rotation stop means comprise a portion (28) that extends from the rotation pin (24).

14. The eyewear according to claim 13, comprising a portion (30) connecting the stop portion (28) to the rotation pin portion (24).

15. The eyewear according to claim 14, wherein the portion (30) connecting the stop portion (28) to the rotation pin portion (24) extends at an angle towards the back of the eyewear.

16. The eyewear according to claim 14, wherein the portion (30) connecting the stop portion (26) no the rotation pin portion (24) extends above the sidepiece.

17. The eyewear according to claim 14, wherein the portion (30) connecting the stop portion (28) to the rotation pin portion (24) lies in a substantially horizontal plane.

18. The eyewear according to claim 14, comprising a second portion (32) connecting the stop portion (28) to the rotation pin portion (24).

19. The eyewear according to claim 18, wherein the second portion (32) connecting the stop portion (28) to the rotation pin portion (24) extends at an angle towards the back of the eyewear 20. The eyewear according to claim 18, wherein the second portion (32) connecting the stop portion (28) to the rotation pin portion (24) lies in a substantially horizontal plane.

21. The eyewear according to claim 18, wherein the second portion (32) connecting the stop portion (28) to the rotation pin portion (24) extends under the sidepiece.

22. The eyewear according to claim 18, wherein the second connecting portion (32) ends with a hooked portion (34) that engages the rotation pin portion (24).

23. The eyewear according to claim 22, wherein the hooked portion (34) has an end portion (34a) that runs in substantially the same direction as the connecting portion (32) from which it extends.

24. The eyewear according to claim 14, wherein the first and/or the second portion (30, 32) connecting the stop portion

(28) to the rotation pin (24) are joined by respective curved sections (304, 308, 328) to the respective pin portions (24, 28).

25. The eyewear according to claim 1, comprising a semi-annular portion (28, 30, 32) extending from the rotation pin portion (24) on the latter's outer side.

26. The eyewear according to claim 18, wherein the rotation stop portion (28) and the first and second connecting portions (30, 32) form a semi-annular portion that engages the sidepiece (16) on the latter's outer side.

27. The eyewear according to claim 1, wherein the length of the respective connecting portion (30, 32) is greater than the distance between the rotation hole (26) and a corresponding edge adjacent to the sidepiece.

28. The eyewear according to claim 8, wherein the distance between the means (28) for stopping the rotation of the sidepiece and the rotation pin (24) is adjustable.

29. The eyewear according to claim 14, wherein the angle of the respective portion (30, 32) connecting the rotation pin (24) to the rotation stop means (28) is adjustable.

30. The eyewear according to claim 1, comprising a portion (36) extending from the lens means (12) and from which the rotation pin (24) in turn extends.

31. The eyewear according to claim 30, wherein the extension portion (36) extends at an angle towards the back of the eyewear.

32. The eyewear according to claim 31, wherein the respective portion (30, 32) connecting the stop portion (28) to the rotation pin portion (24) is inclined towards the back of the eyewear at an angle that differs from the angle made by the extension portion (36).

33. The eyewear according to claim 30, wherein the extension portion (36) lies in a substantially horizontal plane.

34. The eyewear according to claim 30, wherein the angle of the extension portion (36) is adjustable.

35. The eyewear according to claim 1, comprising a portion (38) for attachment to the lens means (12).

36. The eyewear according to claim 35, wherein the extension portion (36) extends directly from the portion (38) for attachment to the lens means (12).

37. The eyewear according to claim 1, wherein the means (20, 22) connecting the lens means (12, 14) to the sidepiece means (16, 10) are made from metal wire.

38. The eyewear according to claim 37, wherein the metal wire is made of titanium.

39. The eyewear according to claim 1, wherein the lens mounting means (17, 19) are made of horn.

40. A method for manufacturing an eyewear (10) comprising lens means (12, 14), sidepiece means (16, 18) for supporting the eyewear, and means (20, 22) for connecting the lens means to the sidepiece means made of horn, wherein the means for connecting the lens means (12, 14) to the sidepiece means (16, 18) are made of a metal wire defining a pin portion (24) connected to the lens means (12) and which is inserted into a hole (26) in the respective sidepiece (20) to form means for rotating the sidepiece (20) with respect to the lens means (12), said method comprising:
inserting a piece of metal wire (100) into a hole (26) in the respective sidepiece means (16) and the piece of metal wire is bent to form means for rotating the sidepiece.

41. The method according to claim 40, wherein the piece of metal wire (100) is bent to form means for rotating the sidepiece and means for attaching the sidepiece.

42. The method according to claim 40, wherein the piece of metal wire (100) is bent to form means for stopping the rotational opening movement of the sidepiece.

43. The method according to claim 40, wherein a piece of metal wire is bent in such a way as to form a main longitudinal portion (24, 36, 38) from which a transversal portion (30) extends, with a second longitudinal portion (28) in turn extending from this transversal portion (30).

44. The method according to claim 43, wherein the second longitudinal portion (28) is shorter than the first longitudinal portion (24, 36, 38).

45. The method according to claim 43, wherein a second transversal portion (32, 34) extends from the second longitudinal portion (28).

46. The method according to claim 43, wherein the main longitudinal portion (24, 36, 38) is inserted into a hole (26) in a respective sidepiece (16) in such manner that the portion (24), closest to the transversal portion (30), remains inside the hole (26) in the sidepiece.

47. The method according to claim 43, wherein the main longitudinal portion (24, 36, 38) is inserted into a hole (26) in a respective sidepiece (16) in such manner that the portion (24) closest to the transversal portion (30) remains inside the hole (26) in the sidepiece and the second transversal portion (32, 34) goes through the body of the sidepiece (16) to the side opposite, the one where the first transversal portion (30) is positioned.

48. The method according to claim 47, wherein the free end (34) of the second transversal portion is bent around the first longitudinal portion (34) to form a hooked attachment portion.

49. The method according to claim 48, wherein the remaining part of the first longitudinal portion (24, 36, 38) is bent so it lies in substantially the same plane as the sidepiece so as to form the extension portion for attachment to the lens means.

* * * * *